United States Patent Office 3,556,952
Patented Jan. 19, 1971

3,556,952
BIMETALLIC PRINTING PLATES

John S. Fry, Somerville, Julius L. Silver, Somerset, and Richard W. Quarles, Princeton, N.J., assignors to Union Carbide Corporation, a corporation of New York No Drawing. Continuation-in-part of application Ser. No. 409,977, Nov. 9, 1964. This application May 18, 1966, Ser. No. 550,926
Int. Cl. B41n 1/04
U.S. Cl. 204—17 10 Claims

ABSTRACT OF THE DISCLOSURE

A method of preparing a bimetallic printing plate which comprises subjecting a hydrophilic metal substrate to an aqueous solution of a water soluble salt of a hydrophobic metal through a membrane held in intimate contact with the hydrophilic substrate, the membrane being an insolubilized association product of phenolic resin and an ethylene oxide polymer and being characterized by areas of water permeability and water impermeability and thereafter reducing the salt of a hydrophobic metal to hydrophobic metal.

This application is a continuation-in-part of copending application Ser. No. 409,977 filed Nov. 9, 1964 and now abandoned.

The present invention relates to an improvd method of preparing bimetallic printing plates. More particularly, this invention relates to a direct method of preparing long run bimetallic printing plates as either half-tone or continuous-tone planographic printing plates.

Planographic printing plates function by the provision of two areas one of which is generally oleophilic-hydrophobic, and the other is generally oleophobic-hydrophilic. When the plate is used on offset printing presses the oil based ink is repelled by the oleophobic-hydrophilic areas and retained by the oleophilic-hydrophobic areas. In this process the oleophilic areas print a single density. In order to provide prints which have shading and tones the plate image areas are formed photographically through a screen. The resultant image area is composed of many dots of varying size depending on the tone. This is the half-tone process. The continuous-tone process provides tone ranges without the use of a screen. The resultant print appears more like a photograph than a print because the image is not composed of uniform dots.

While a large number of printing plates have been provided which are capable of printing half-tone, only two successful plates have been provided capable of printing continuous-tone. One of these is the Collotype plate and the other is the Association Product plate more completely described hereinafter. Both of these plates print tonal ranges by retaining an amount of ink proportional to the tone range of the image.

While both of these systems provide excellent reproductions in continuous tone the printing life of the plates generally does not exceed about 50 thousand prints. While these printing lives are relatively short, they are ample for the large majority of printing done by the average printing establishment.

In those fields of printing where exceptionally long printing runs are required, such as in the printing of magazines, metallic plates are used. These plates can provide excellent prints in excess of one hundred thousand impressions. Unfortunately, until the present time the metallic plates were limited in tonal reproduction to half-tone or screened prints. Additionally, the preparation of these plates required a high degree of skill and a large amount of time.

The bimetallic plate is generally prepared by plating a substrate hydrophilic metallic sheet with a thin coating of metal exhibiting hydrophobic properties. For example, an aluminum sheet provides a hydrophilic surface and a plated copper surface provides a hydrophobic surface. The copper plated aluminum sheet is coated with a photoresponsive resist. This coating is exposed to a light source through a transparency. Those areas of the coating which are exposed become hardened and less soluble then the unexposed portion. The unexposed portions of the gelatin are then removed by washing and the plate is etched by dipping in a mild etching solution. The exposed coating protecting the copper plating from the etching solution is then removed. The resultant plate has a hydrophilic aluminum non-image area and an oleophilic copper image area. Another method of providing this plate is by coating the aluminum or substrate sheet with a resist, exposing it through a transparency, removing the unexposed portions, plating the sheet with copper and then removing the resist mask. This method provides a reversed image in respect to the other method.

The continuous-tone bimetallic printing plate has an image of a hydrophobic metal plated in a hydrophilic metal substrate. The image is characterized by microscopic random dots which form the image and provide tonal areas. Unlike half-tone plates there is no uniform disposition of dots. Until the present time no successful continuous-tone bimetallic printing plates have been proposed by the art.

Accordingly it is an object of this invention to provide a bimetallic printing plate capable of printing in continuous tone.

It is another object of this invention to provide an improved method of preparing bimetallic printing plates for either continuous-tone or half-tone printing.

Other objects of this invention will become apparent from the disclosure which follows.

In accordance with the present invention the above objects are accomplished by subjecting a hydrophilic metal substrate to an aqueous solution of a water soluble salt of a hydrophobic metal through an association product membrane held in intimate contact with said hydrophilic metal substrate. The association product membrane is an insolubilized association product of a phenolic resin and an ethylene oxide polymer and is characterized by areas of water permeability and water impermeability. The salt of the hydrophobic metal is then reduced to hydrophobic metal on the hydrophilic metal substrate by a suitable reducing means.

The association product membrane is therefore a selective membrane in respect to the plating process. The association product forming the membrane, is by its nature organic solvent soluble, hydrophilic and water permeable. When it is insolubilized by heating or other means, the product retains its hydrophilic, water permeable properties but becomes organic solvent insoluble. When this insoluble association product is photosensitized and exposed to light selectively through a photographic transparency, those areas exposed to light become hydrophobic-water impermeable. By the peculiar nature of the association product it produces an image in continuous-tone by random dot formation. The association product is used in this invention to provide selective hydrophobic metallic plating on a hydrophilic metal substrate. Half-tone bimetallic printing plates can also be provided by this invention.

The selective plating can be conveniently accomplished by coating a hydrophilic metal substrate with an association product of a phenolic resin and an ethylene oxide polymer, insolubilizing the coating to organic solvents such as dimethyl formamide, photosensitizing the association product coating through the application of a suitable photosensitizing agent, and exposing the photosensitized coating to light through a transparency. The exposed coated substrate is then immersed in an aqueous solution of a water soluble salt of a hydrophobic metal. The salt of the hydrophobic metal is then reduced to metal on the hydrophilic metal substrate through the membrane coating in the form of the transparency image. The reduction of the hydrophobic metal salt to metal can be accomplished by chemical or electrolytic means.

In another embodiment of this invention the association product is formed either as a self-supporting film or as a coating on a suitable substrate. The association product is then similarly insolubilized, photosensitized and exposed to light. The association product is then soaked in an aqueous solution of a hydrophobic metal salt. The association product is then placed in intimate contact with a hydrophilic metal substrate and the hydrophobic metal salt is reduced to metal on the hydrophilic metal substrate. Again this reduction can be accomplished electrolytically or chemically.

By the term "association product" is meant an admixture of hydrophilic and hydrophobic organic resins which associate by weak bonding such as hydrogen bonding. Exemplary of association products and preferred for the practice of this invention are the association products formed from the association of an ethylene oxide polymer and a phenolic resin.

The ethylene oxide polymer component of the preferred compositions of this invention is selected from the resinous ethylene oxide polymeric materials having an average molecular weight in the range of from about 50,000 to about 10,000,000, which are readily soluble in water. The term "ethylene oxide polymers" refers to polymers possessing the repeating unit ($—CH_2—CH_2O—$) as represented by the class of commercial Polyox resins; and the term is intended to include water soluble ethylene oxide polymer resins wherein ethylene oxide is the predominant monomer polymerized therein but which can also contain polymerized residues of other olefin oxides as exemplified by copolymers and terpolymers of ethylene oxide with other copolymerizable monomers containing single epoxide groups such as propylene oxide, butylene oxide, styrene oxide and the like. Poly(ethylene oxide) homopolymer is however used hereinafter as representative of these resins.

The phenolic resin component of the association product used in the present invention are the heat fusible condensation products of a phenol with an aldehyde. Such condensation products are divided into two classes, resoles and novolaks, either of which can be used in this invention as shown hereinafter. These two types of resins are discussed in order below. Both of these classes of phenolic resins will form in association with ethylene oxide polymers.

While these phenolic resins are in the fusible form when making the association product (as hereinafter more clearly set forth) the fusible condition is not necessarily a critical condition of the association product, in which it is possible for a portion or all of the phenolic resin component be fully advanced to the cured state.

The fusible resole phenolic resins can advance upon heating to a degree of cure and polymerization to attain a completely insoluble state. These insoluble phenolics cannot be used in the preparation of the association product compositions but are believed to be present in the cured compositions. In the preparation of the present compositions only those heat fusible phenolic resins which are soluble in water, alkali or organic solvents such as acetone, ethanol and the like and which are sufficiently fusible to permit admixture and association with the ethylene oxide polymers can be used. These resins include those resole phenolic resins which have not cured to a degree of insolubility as well as the novolak resins discussed below.

RESOLE RESINS

Resole resins, are generally produced by the condensation of phenols and aldehydes under alkaline conditions. Resoles differ from novolaks in that polynuclear methylol-substituted phenols are formed as intermediates in resoles. A resole produced by the condensation of phenol with formaldehyde most likely proceeds through an intermediate having the following illustrated type structure.

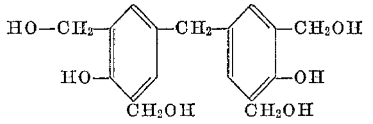

In a typical synthesis, resoles are prepared by heating one mole of phenol with 1.5 moles of formaldehyde under alkaline conditions.

The resole resins are prepared by the condensation of phenol with formaldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol, 2,2-bis(p-hydroxyphenyl)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin, and 1,3,5-trioxane. Ketones such as acetone are also capable of condensing with phenolic compounds, as are methylene engendering agents such as hexamethylenetetramine.

The condensation of a phenolic compound and an aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

NOVOLAK RESINS

The novolak resins are prepared in a manner similar to that to prepare the resole resins. The distinguishing exception in this preparation is however that the reaction is generally conducted in an acidic media, instead of an alkaline media as is the case with the resoles. When less than six moles of formaldehyde are used per seven moles of phenol the products are permanently fusible and soluble. These are the novolak resins. The novolaks have a different structure than the resoles as is illustrated by the novolak condensation products of phenol with formaldehyde:

(a)
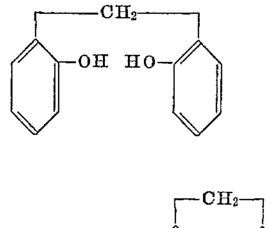

(b)
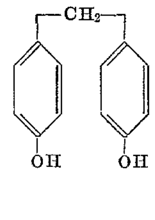

(c)
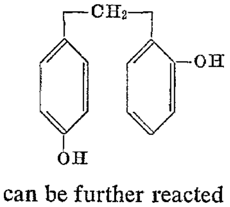

The novolaks can be further reacted with formaldehyde or with a compound such as hexamethylene tetramine, to a state of cure which is similar in the nature to the curing pattern of the resoles.

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

The ratio of components in the photosensitive compositions should be within specific limits in order to obtain satisfactory results when the compositions are employed in the preparation of association product printing plates. The quantity of ethylene oxide polymer in the compositions can vary between about 0.2 and 3 parts by weight per part of phenolic resin, with the preferred ratio being between about 0.6 and 1.8 parts of ethylene oxide polymer per part of phenolic resin.

The association product can be conveniently formed by dissolving the phenolic resin component and the ethylene oxide component in a suitable solvent such as dimethyl formamide. This solution can then be applied as a coating to a substrate and dried.

In the present invention, it is necessary to insolubilize the association product membrane before photosensitization and exposure.

The coating can be conveniently insolubilized by heating for a period and at a temperature sufficient to render the coating insoluble. This can be accomplished by heating for a period of from 5 to 30 minutes at a temperature of from 120° to 200° C. and preferably from 140° to 190° C.

The insolubilized coating is hydrophilic and water permeable but is not water soluble.

While not wishing to be bound by any theory of mechanisms, it is believed that the outstanding characteristics of the photosensitive compositions of the "association" or "complex" formation between the phenolic resin component and the ethylene oxide polymer component. The term "association" refers to the interaction which provides the binding force between the ethylene oxide polymer component and the phenolic resin component. It is believed that the interaction involves one or more diverse mechanisms such as hydrogen bonding, electrostatic bonding, secondary valence forces, and the like. It appears that the phenomenon concerning hydrogen bonding can best explain the nature of the interaction. The "associating" or "complexing" interaction between the phenolic resin component and the ethylene oxide polymer component in the photosensitive compositions might be visualized in the following manner:

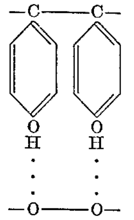

The "association" of the resole resin component and the ethylene oxide polymer component causes the formation of a tough, hydrophilic material when sheeted, molded, or coated on a substrate.

The above-postulated mechanisms of interaction are merely theoretical and should not be construed as limiting thereto. Other theories or reasons may equally well explain the true nature of the interaction.

When these association product plates are photosensitized by a suitable photosensitizing agent and exposed to light the exposed photosensitized areas of the plate become hydrophobic while the unexposed portions of the plate retain their character of hydrophilicity.

Suitable sensitizing agents are those which when exposed to light at ambient temperatures release free radicals capable of reacting with the resin component of the association product. Illustrative of suitable photosensitizing agents are light-sensitive diazo and diazonium compounds (diazoliths), azides and water-soluble hexavalent chromium compounds. As used herein, the term "diazo" is meant to include diazonium and azido compounds. Illustrative of the classes of photosensitizers are rosin derivatives of diazonaphthol- and diazophenol-sulfonamides; ortho-quinone-diazide; condensation products of diazo-diazylamine and formaldehyde; 4,4'-diazidostilbene-2,2'-disulfonic acid salts; azidostyrylketones of the type described in French Pat. No. 886,716 such as 4-azidobenzalacetone-2-sulfonic acid salts; 1,5-diazidonaphthalene-3,7-disulfonic acid salts; 4-azidonaphthalene-1,8-dicarboxylic acid salts; 4,4-diazidodiphenylmethane-3,5-dicarboxylic acid salts; 2-diazo-1-hydroxynaphthalene-5-sulfonic acid salts; para-diazodialkylanilines; para-diazophenylmorpholine; para-diethyl amino benzene diazonium fluoborate; 2-methyl benzene diazonium fluoborate; para-fluorophenyl diazonium fluoborate; 1,5-naphthalene tetrazonium fluoborate; ammonium chromate; ammonium bichromate; sodium chromate; sodium bichromate; potassium chromate; potassium bichromate, and the like.

Particularly suitable photosensitizers are the polyhalogenated alkanes containing from 1 to 8 carbon atoms inclusive and polyhalogenated alkanols containing from 2 to 8 carbon atoms inclusive and wherein in both instances the halogen atoms exhibit molecular weights in excess of 40. Illustrative of these sensitizers are bromoform, iodoform, diiodoethane, triiodopropane, dibromodiiodobutane, hexaiodohexane, hexabromooctane, triiodoethanol, tetraiodobutanol, triiodopentanol, hexaiodooctanol and the like.

The photosensitizing ability of the various alkane iodides or bromides is a function of quantum yield [1] which in turn depends on the chemical structure of the respective iodides or bromides. Generally, the quantum yield increases as the number of halogen atoms in the compounds increases, and as the length of the hydrocarbon chain increases. The quantum yield is also higher if the iodine atoms are on a tertiary carbon atom rather than a primary or secondary carbon atom. On this basis, the photosensitizing ability of various iodides, in the order of increasing efficiency, is exemplified by the following sequence:

$$CH_3I < CH_3CH_2I < CH_3(CH_2)_2I < CH_3(CH_2)_3I < (CH_3)_3CI < CH_2I_2 CHI_3$$

Iodoform is a particularly outstanding photosensitizing agent in the practice of the present invention.

The photosensitive component is conveniently coated on the plates as a solution in solvents such as benzene, carbon disulfide, diethyl ether, ethyl acetate, methanol, ethanol, acetone, water, and the like. The concentration of the photosensitizer in the solvent will control the thickness of the coating and this will influence the time needed for satisfactory exposure in the development of the printing plate. A preferred photosensitizer coating solution consists of between about ½ percent and 10 percent iodoform in acetone. The coating can be applied by wiping on the solution with a cloth, or by pouring onto the plate in a whirler.

The association produce can also be conveniently photosensitized by incorporating the photosensitizer in the association product composition. While any of the photosensitizer indicated above can be incorporated into the association product composition, it is preferred to use non-volatile photosensitizers for incorporation. This preference is dictated by the loss of volatile photosensitizers during the curing period of the plate. The bichromate photosensitizers are excellent non-volatile photosensitizers.

The photosensitized plate or coating is exposed to a light source through a transparent pattern, i.e., a transparency, to form an image on the photosensitive surface. The transparency can be either the continuous-tone or half-tone type. The light source can be sunlight, carbon-

[1] Quantum yield refers to the number of molecules reacting chemically per photon of light absorbed.

arc light mercury vapor light or other light source of suitable intensity.

It appears that the image is formed due to the fact that each infinitesimal area of the coating hardens in proportion to the amount of light it receives and consequently becomes proportionally less hydrophilic, and water permeable.

The association product resin can be used as a coating on a suitable substrate such as paper, cloth, plastic or metal or can be used as a sheet or film either self-supporting or laminated to a suitable substrate, or can be directly coated on the hydrophilic metal base of the bimetallic printing plate itself, to form the permeable membrane.

Once the association product has been photosensitized and exposed forming the image desired, it is suitable for use in the present invention.

By the term "hydrophilic metal" is meant any of the metals commonly known to the printing plate industry as exhibiting hydrophilic surfaces or those which can readily be rendered hydrophilic by common techniques well known to the art such as providing a gum arabic film, treatment with silicate solutions and the like. The hydrophilic metals can also be defined in degree of water wetability, for example those metals which exhibit a contact angle to water of less than 50° can be said to be hydrophilic. Hydrophilic metal substrates having water contact angles less than 50° and preferably less than 30° are accordingly suitable as substrate materials in this invention.

Illustrative of hydrophilic metals are chromium, aluminum, magnesium, stainless steel, nickel, lead, zinc, and the like, as well as the various alloys.

The hydrophilic substrates can be in any form suitable for mounting on a printing press, for example, sheet, drum, roll, flexible sheet and the like. These substrates can be sheet metal, foil laminated to or mounted on a suitable support material such as paper, plastic or other metal, or they may be used as surface coatings, or plate on other metals.

By the term "hydrophobic metals" is meant those metals which are known and used in the printing industry as exhibiting hydrophobic-oleophilic surfaces or those which can readily be rendered hydrophobic. The hydrophobic metals can be said to be those which exhibit a contact angle to water greater than 50°. Hydrophobic metals having a water contact angle greater than 50° and preferably greater than 60° are accordingly suitable in this invention.

The salts of these hydrophobic metals as used in this invention are those which are water soluble and which can be reduced either chemically or electrolytically to the metal of the cation. Such salts conveniently include nitrates, sulfates, acetates, and the like.

The association product plate having been photosensitized and exposed to light through a suitable transparency is then immersed in an aqueous solution of hydrophobic metal salt such as copper sulfate.

The concentration of the hydrophobic metal, water-soluble salt solution can range from 1% to a saturated solution. Preferred ranges are dependent on the solubility of the salt, and the plating practices as determined by the equipment used. Conventional plating baths as conventionally used in the art are suitable in the practice of this invention.

The salt of the hydrophobic metal can be effectively reduced to metal by any convenient means known to the art such as electrolysis or chemical reduction.

If the hydrophilic metal substrate to be used will reduce the salt to metal by contact, then the exposed association product plate need only be soaked in the aqueous solution of the salt of the hydrophobic metal, be dried of surface solution and held in intimate contact with the hydrophilic substrate.

When electrolytic reduction is to be employed several techniques can be used. The association product membrane can be formed by coating on the hydrophilic substrate, be photosensitized, and exposed. The coated substrate is then connected to a power source (D.C.) as the cathode and is placed in a plating bath containing the water soluble salt of the hydrophobic metal. An electrode of the hydrophobic metal is connected to the power source as the anode and is also placed in the bath. Electrolytic plating occurs when a current is impressed on the electrodes.

Similarly the membrane coated hydrophilic substrate, after photosensitization can be merely soaked in a solution of the water soluble salt of the hydrophobic metal. Then a sheet of hydrophobic metal is placed in intimate contact with the association product membrane. A power source is connected to the cathode hydrophilic metal plate and to the anode hydrophobic metal plate and a current is impressed on the plates. Plating of the substrate is effected in the image prescribed by the exposure.

In a variation of this method the association product can be coated on the hydrophobic metal sheet instead of the hydrophilic metal sheet.

A self-supporting film or membrane of an association product can also be similarly used. In this instance the self-supporting membrane is photosensitized and exposed to light. The film is then soaked in an aqueous solution of the salt of the hydrophobic metal and is sandwiched between the cathode hydrophilic metal plate and the anode hydrophobic metal plate.

Similarly many other variations of this process will occur to those skilled in the art without departing from the scope of this invention.

As indicated previously applicant does not intend to be bound by theory, however, it is believed that continuous tone images are formed by random dot printing. It is further believed that the association product membranes as coatings or plates are hardened in this pattern of random dots upon exposure to light. Since the unexposed portions of these plates or coatings will readily absorb and transmit aqueous salt solution and the exposed portions will not, it is believed that a hydrophobic metal such as copper is plated out on the hydrophilic substrate in a pattern of random dots, thus providing a surface capable of printing in continuous-tone. This however is merely theoretical and other theories may equally well explain this phenomena.

The method of the present invention can be applied as equally well to the production of bimetallic printing plates for half-tone printing. This is conveniently accomplished in the same manner except that a half-tone negative or screened continuous-tone negative is used when exposing the photosensitized association product surface. In this last case the hydrophobic metal is plated out in the distinct patterns dictated by the screen.

The phenolic resin-ethylene oxide polymer association product compositions used in this invention can contain various additives to enhance specific properties of the compositions, such as photoresponse, reduction of tack improvement in toughness and the like. The presence or absence of such additives does not detract from the utility of such compositions in this invention.

The illustrations and examples which follow serve to illustrate this invention.

Illustration I

This illustration exemplifies the preparation of conventional phenolic resins useful in the practice of the present invention.

(a) Phenol-formaldehyde resole resin.—A mixture consisting of 1 mole of phenol, 3 moles of paraformaldehyde, 6 moles of water and 0.3 mole of sodium acetate trihydrate is refluxed at atmospheric pressure for a period of time between about two and one-half hours and three and one-half hours until the solution becomes cloudy. Two distinct phases begin to form as the resin precipitates from the refluxing mixture. Heating is continued for an additional five minutes and the hot mixture is then poured into water to completely precipitate the resin. The solid resin is recovered by filtration or decantation or other suitable separation method and washed thoroughly with water. The resin is dissolved in a suitable solvent such as methyl ethyl ketone, and anhydrous sodium sulfate is added to dry the solution. The water free solution is recovered by filtering out the sodium sulfate.

(b) Meta-cresol-formaldehyde resole resin.—Meta-cresol, paraformaldehyde and sodium acetate trihydrate in a molar ratio of 1:2.5:0.3, respectively, are mixed in water to form a dilute slurry (about 200 milliliters of water per mole of meta-cresol). This mixture is refluxed at atmospheric pressure until resin begins to precipitate, which is normally about a twenty-minute reaction period. The heating is continued an additional five minutes, and the reaction mixture is poured into cold water to completely precipitate the resin. An anhydrous solution of the resin in methyl ethyl ketone is prepared in the same manner as above.

(c) Resorcinol-formaldehyde resole resin.—A mixture of resorcinol, sodium sulfate and formalin (37 percent solution of formaldehyde in water) in a molar ratio of about 1:0.2:0.8, respectively, is dissolved in water (about 100 milliliters of water per mole of resorcinol). The reaction mixture is heated on a steam bath until the solution turns cloudy, then it is poured into cold water to completely precipitate the resin product. The resin is recovered and prepared as an anhydrous solution in methyl ethyl ketone in the manner described above.

(d) Phenol-formaldehyde novolak resin.—One hundred grams of phenol is dissolved in 69 grams of 37 percent formalin solution and about 0.55 gram of oxalic acid is added. This mixture is refluxed at a temperature of about 80° C. for a period of about 6 hours at the end of which period the solution becomes cloudy. Water is then distilled from the reaction mixture until the temperature of the resinous mass reaches about 150° C. The resin is then discharged from the reaction vessel and allowed to cool. At room temperature the cooled resin is brittle and is readily pulverized to a powdery state.

Illustration II

Preparation of an association product.—A phenolic resin-ethylene oxide polymer resin is prepared as follows: 32 parts by weight of a resole phenolic resin condensation product of phenol and formaldehyde and 48 parts by weight of a water soluble ethylene oxide homopolymer having a molecular weight of from about 2 to 3 million were added to 2,400 milliliters of N,N-dimethylformamide. The resinous components were dissolved in the solvent with the aid of a high speed vortex blender.

This solution is used in the examples that follow.

EXAMPLE I

Transfer plating from coated paper

A sealed heavy paper stock is coated with the association product coating composition of Illustration II. This coated paper substrate is baked for a period of 20 minutes at a temperature of 160° C. After baking the coating is photosensitized with iodoform. Photosensitization is effected by coating the association product coated substrate with a one percent solution of iodoform in acetone. The photosensitized substrate is exposed to an arc light source through a half-tone negative for a period of two minutes. After soaking the exposed plate in a 1:1 water:methanol mixture for a period of 3 minutes, the paper is dipped in a 10%-copper sulfate solution for a period of 10 minutes and drained free of solution but not dried. This association product coated plate is pressed face down on a clean cold rolled steel panel for a period of five minutes and then removed. A copper image appears on the steel plate which corresponds to the dark areas of the original negative. A bimetallic plate is thereby prepared.

EXAMPLE II

Direct plating—Continuous-tone

Cold rolled steel panels are whirl coated with the formulation of Illustration II, baked 20 minutes at 165° C. and sensitized in a 1% solution of iodoform in acetone for one minute. The plates are exposed to U.V. arc light through a continuous tone positive transparency for four minutes. After washing one plate in water for three minutes, it is dipped in a 5% copper sulfate solution for 5 minutes. The coating was then removed with tetrachloroethane and there remained a copper image corresponding to the non-light struck areas. Examination of the plate with a magnifying glass revealed that the copper plating was of a random dot nature and therefore of a continuous tone type of bimetallic printing plate.

The second plate was not prewashed prior to dipping in the plating solution, but was directly dipped for two minutes. A copper image appeared in reverse orientation to the above plate. In this case the copper image appears in the areas struck by light.

A theoretical explanation for this is that degraded polyether in the light struck areas is not removed in a wash step and it absorbs copper sulfate solution faster than the undegraded polyether-phenolic complex. Extended dipping of the second plate results in a completely copper plated panel. The first method is more reproducible.

The random dot plated plate is inked and pressed on paper to produce prints in continuous-tone.

EXAMPLE III

Electrolytic plating on aluminum

An association product coating composition is prepared as described in Illustration II, above. This composition has the following formulation:

Phenolic resin: Phenol-formaldehyde resole phenolic resin having an average molecular weight of about 440—80 grams.
Ethylene oxide polymer: Poly(ethylene oxide), which is water soluble and which exhibits a molecular weight of between 2–3 million—120 grams.
Curing aid: Aluminum nitrate—5 grams.
Solvent: N,N-dimethylformamide—3000 milliliters.

This coating composition is whirl coated onto clean aluminum panels. After baking for a period of about 20 minutes at a temperature of 165° C., the panels are treated in a solution of acetone containing 1% iodoform in order to photosensitize the coating. A photosensitized coated panel is covered with a half-tone negative and exposed to a carbon arc light source for a period of 4 minutes. The exposed panel is washed in a 1:1 mixture of methanol and water or a period of three minutes. After washing this plate is placed in an electrolytic plating bath containing a 5 percent solution of cupric ammonium chloride and is established as a cathode by contacting the aluminum plate to a 6 volt battery. A copper bar is placed in the electrolytic bath and is established as the anode. A current impressed upon the electrodes and is continued for a period of three minutes. The coated aluminum panel is removed from the bath and the coating is removed. A copper image is found plated on the aluminum panel which corresponds to the nonlight struck areas of the coating.

In a similar manner other plating solutions such as copper chloride can be used.

What is claimed is:

1. A method of preparing a bimetallic printing plate which comprises subjecting a hydrophilic metal substrate to an aqueous solution of a water soluble salt of a hydrophobic metal through a membrane held in intimate contact with said hydrophilic substrate, said membrane being an insolubilized association product of phenolic resin and an ethylene oxide polymer and being characterized by areas of water permeability and water impermeability and thereafter reducing said salt of a hydrophobic metal to hydrophobic metal.

2. A method of preparing a bimetallic printing plate which comprises exposing a photosensitized membrane of an insolubilized association product composed of a phenolic resin and an ethylene oxide polymer to a light energy source through a photographic transparency for a period of time to provide water permeable and water impermeable areas to the insolubilized membrane and thereafter subjecting a hydrophilic metal substrate to an aqueous solution of the salt of a hydrophobic metal through the said exposed membrane wherein the exposed membrane is held in intimate contact with said hydrophilic metal substrate and thereafter reducing the salt of the hydrophobic metal to hydrophobic metal on said hydrophilic substrate.

3. The method of claim 2 wherein said insolubilized association product membrane is in the form of a coating on said hydrophilic metal substrate.

4. The method of claim 2 wherein the water soluble salt of the hydrophobic metal is reduced by electrolytic means.

5. A method of preparing a bimetallic printing plate which comprises the steps of coating a hydrophilic metal substrate with an association product of a phenolic resin and an ethylene oxide polymer wherein the ethylene oxide polymer has a molecular weight of from 50,000 to ten million and is present in an amount of from 0.2 to 3 parts by weight per part of phenolic resin, baking said coated substrate at a temperature of from 120° to 200° C. for a period of from about 5 to about 30 minutes, photosensitizing said association product coating by application of a suitable photosensitizing agent, exposing said coated plate to light through a transparency, thereafter immersing said coated plate in an aqueous solution of a water soluble salt of a hydrophobic metal, reducing said hydrophobic metal from its water soluble salt solution causing it to plate on the hydrophilic metal substrate in the form of the latent image impressed on the association product coating and thereafter removing said association product coating.

6. The method of claim 5 wherein the photosensitized association product is exposed to light in continuous-tone.

7. The method of claim 5 wherein the photosensitizing agent is incorporated into the association product coating composition.

8. The method of claim 5 wherein the hydrophobic metal water soluble salt is reduced to metal electrolytically by connecting the hydrophilic metal substrate to a power source as the cathode and connecting a metal electrode of the hydrophobic metal to the power source as the anode, immersing the electrodes in a plating bath of the hydrophobic metal salt and impressing a current in the electrodes thereby effecting electrolytic plating.

9. The method of claim 7 whereby the photosensitized association product is exposed to light in continuous-tone.

10. The method of claim 5 wherein the said phenolic resin is a resole phenolic resin.

References Cited

UNITED STATES PATENTS

| | | | |
|---|---|---|---|
| 2,506,164 | 5/1950 | Morse | 204—17 |
| 2,676,886 | 4/1954 | Barbarite | 204—38X |
| 2,791,504 | 5/1957 | Plambeck | 156—20X |
| 3,085,051 | 4/1963 | Hamm et al. | 204—18 |
| 3,106,155 | 10/1963 | Eastman et al. | 204—18 |
| 3,175,964 | 3/1965 | Watanabe et al. | 204—37 |
| 3,231,381 | 1/1966 | Dickinson et al. | 96—75 |
| 3,284,202 | 11/1966 | Leonard | 204—33X |
| 3,309,202 | 3/1967 | Silver | 96—86X |
| 3,409,487 | 11/1968 | Fry et al. | 156—13 |

JOHN H. MACK, Primary Examiner

W. VAN SISE, Assistant Examiner

U.S. Cl. X.R.

29—194; 101—401, 458, 459, 463